United States Patent [19]

Brinen et al.

[11] Patent Number: 5,625,015

[45] Date of Patent: Apr. 29, 1997

[54] METHOD FOR MAKING SUPPORTED CATALYST SYSTEMS AND CATALYST SYSTEMS THEREFROM

[75] Inventors: Jeffrey L. Brinen, League City; Anthony N. Speca, Kingwood; Kelly Tormaschy, Houston; Kathryn A. Russell, Seabrook, all of Tex.

[73] Assignees: Exxon Chemical Patents Inc., Wilmington, Del.; Hoechst, Germany

[21] Appl. No.: 461,795

[22] Filed: Jun. 5, 1995

Related U.S. Application Data

[62] Division of Ser. No. 344,837, Nov. 23, 1994, abandoned.

[51] Int. Cl.[6] ............................................. C08F 4/42
[52] U.S. Cl. ........................ 526/160; 526/170; 526/943; 526/348.2; 526/348.5; 502/9; 502/152
[58] Field of Search ............................ 526/160, 170, 526/348.2, 348.5

[56] References Cited

U.S. PATENT DOCUMENTS

| | | | |
|---|---|---|---|
| 3,513,109 | 5/1970 | Stiles | 252/462 |
| 4,118,340 | 10/1978 | Rekers | 252/428 |
| 5,189,123 | 2/1993 | Gropper et al. | 526/106 |
| 5,332,706 | 7/1994 | Nowlin et al. | 502/107 |
| 5,352,658 | 10/1994 | Evertz et al. | 502/107 |

FOREIGN PATENT DOCUMENTS

| | | |
|---|---|---|
| 327649 | 8/1989 | European Pat. Off. . |
| 589638 | 3/1994 | European Pat. Off. . |
| 94 14855 | 7/1994 | WIPO . |
| 95 11263 | 4/1995 | WIPO . |
| 95 12622 | 5/1995 | WIPO . |
| 95 15216 | 6/1995 | WIPO . |
| 96/14155 | 5/1996 | WIPO . |

*Primary Examiner*—David W. Wu
*Attorney, Agent, or Firm*—C. Paige Schmidt

[57] ABSTRACT

Catalyst systems and methods for supporting catalysts and their components, particularly metallocene catalyst components, are provided. The method involves techniques for evenly distributing a small volume of catalyst component over and among a porous support material. Such even distribution is thought to result in reduced fouling.

12 Claims, 5 Drawing Sheets

METHOD FOR MAKING SUPPORTED CATALYST SYSTEMS AND CATALYST SYSTEMS THEREFROM

This is a divisional, of application Ser. No. 08/344,837, filed Nov. 23, 1994 now abandoned.

This invention relates to catalysts, catalyst systems, and to methods for their production and use in olefin polymerization. This invention particularly relates to a process for producing a supported metallocene catalyst system by evenly distributing the catalyst throughout the support material.

BACKGROUND OF THE INVENTION

Supported metallocene catalysts are used in many polymerization systems. These catalyst systems typically contain one or more unsubstituted or substituted cyclopentadienyl rings in combination with a transition metal. Usually an activator, such as an alumoxane or an ionizing activator, completes the system. Typically, one or more catalyst system components is supported on a porous support such as silica. Supporting the catalyst improves the handling characteristics of the polymer product and gives better control of reaction rates.

One of the major problems of polymerization using supported metallocene catalyst systems is a phenomenon known as fouling. Fouling occurs when fines within the reactor accumulate and cling to the walls of the reactor or other components of the polymerization system. These particles continue to polymerize and eventually fuse together and form coatings and/or chunks which can interfere with reactor operations such as polymer discharge and heat transfer.

A number of methods have been proposed to alleviate or eliminate reactor fouling. U.S. Pat. No. 5,332,706 describes a method of forming a supported metallocene catalyst using an incipient impregnation technique wherein a very small volume of solution is mixed with a silica support (also see U.S. patent application Ser. Nos. 265,533, filed Jun. 24, 1994 now abandoned and 265,532, filed Jun. 24, 1994, now abandoned herein fully incorporated by reference.) We have discovered that one problem with techniques such as this, where a smaller, controlled volume of liquid is added to a larger volume of dry solid, is that by pouring the solution over the support or using the traditional batch or dropwise manner, localized areas of overwetting may occur particularly when the catalyst is prepared on a large scale. We believe that this localized wetting and uneven distribution of the catalyst system on the silica contributes to fouling during polymerization. Thus, a method that would enable even distribution of the catalyst system on the support that would work on a large scale and that would reduce fouling during polymerization would be highly desirable.

SUMMARY

This invention generally relates to a new method of producing a supported catalyst comprising evenly applying a divided catalyst solution to a support material. Catalysts produced by this method and the use of catalysts produced by this method are also provided. In one embodiment, this invention relates to a process for producing a supported metallocene catalyst wherein a conical dryer is used both to evenly mix the catalyst solution and support and to dry the catalyst thereafter. This invention also particularly relates to a process for producing supported catalysts comprising: (a) forming a spray, mist, aerosol, or the like from a volume of catalyst solution; and (b) contacting the spray with a porous support material. Preferably, a means of mixing, agitating blending or the like is used while the catalyst solution is contacted with the porous support material. The resulting supported catalyst comprises support material with catalyst solution substantially evenly distributed over the entire volume of support.

DESCRIPTION OF THE DRAWINGS

To supplement the description of the preferred embodiments of the present invention, the following figures are provided.

DETAILED DESCRIPTION OF PREFERRED EMBODIMENTS

Figure 1:
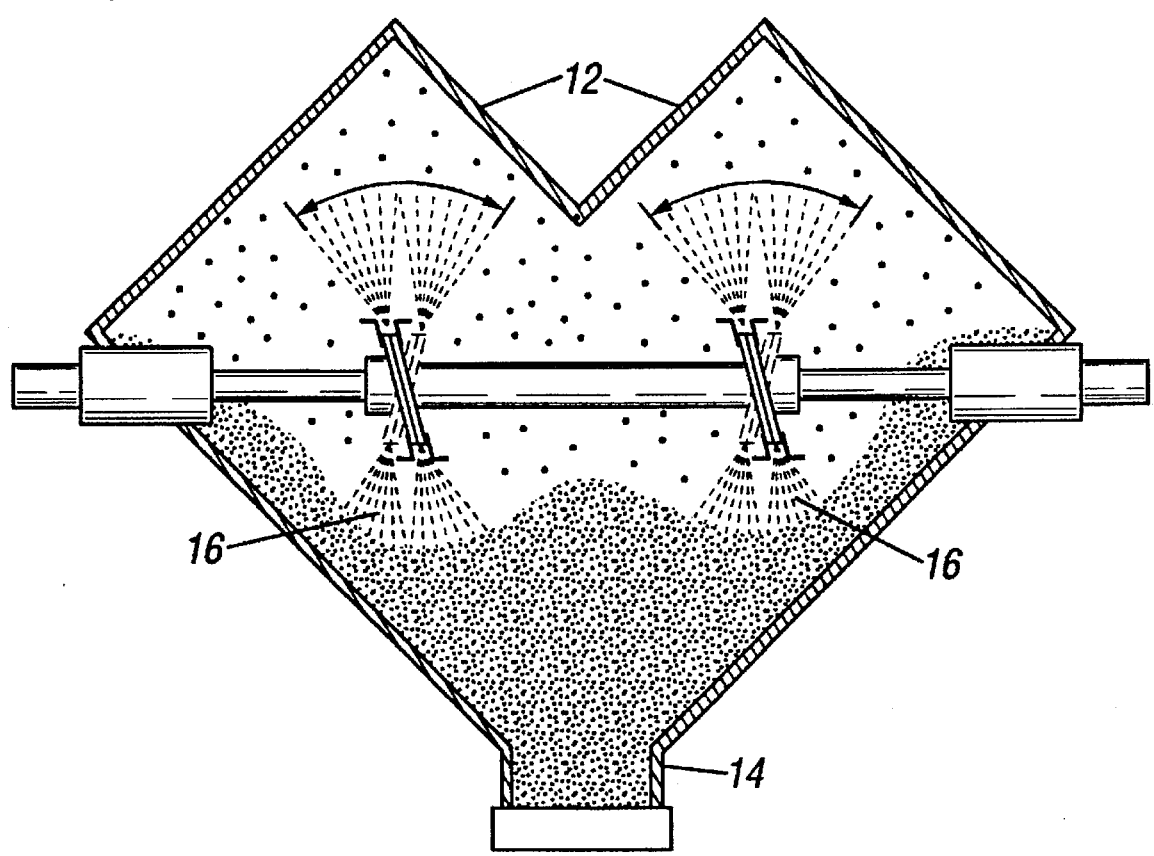
FIG. 1 is a horizontal cross-section of a type of rotating batch blender, specifically, a double-cone blender.

This invention is generally related to supported catalyst systems and to methods of producing supported catalyst systems useful in the polymerization of olefins. The method involves even application of the catalyst to the support using finely divided droplets of catalyst solution and/or thorough mixing. This method results in a substantially uniform distribution of catalyst over and within the support which provides a commercially useful supported catalyst system with both high activity and reduced fouling.

As used herein "catalyst" and "catalyst system" mean any catalyst component, particularly metallocene catalyst components, with or without activator and/or additives. Thus, metallocene and activator either alone or combined are included in the definition of "catalyst." "Support" means any support material, preferably a porous material such as talc, inorganic oxides, inorganic chlorides, and resinous materials such as polyolefin or polymeric compounds.

The process herein described is particularly useful for supporting metallocene catalysts and/or catalyst components. Metallocene catalysts are typically bulky ligand transition metal compounds represented by the formula:

where L is a bulky ligand; A is a leaving group such as but not limited to hydrocarbyl, hydrogen, or any other univalent anionic ligand; M is a transition metal; and m and n are such that the total ligand valency corresponds to the transition metal valency. Preferably the catalyst is four co-ordinate such that the compound is ionizable to a $1^+$ charge state.

The ligands L and A may be bridged. The metallocene compound may be full-sandwich compounds having two or more ligands, L, which may be cyclopentadienyl ligands or cyclopentadiene derived ligands. Alternatively the metallocene compound may be of the half-sandwich type having one ligand, L, which is a Cyclopentadienyl ligand or cyclopentadienyl derived ligand. These types of catalyst systems are described in, for example, PCT International Publication WO 92/00333, WO 94/07928, and WO 91/04257, and WO 94/03506, U.S. Pat. Nos. 5,057,475, 5,096,867, 5,055,438, 5,198,401, 5,264,405 and 5,227,440 and EP-A-0 420 436, all of which are fully incorporated herein by reference.

The metallocene compounds contain a multiplicity of bonded atoms, preferably carbon atoms, forming a group which can be cyclic. The bulky ligand can be a cyclopentadienyl ligand or cyclopentadienyl derived ligand or any other ligand capable of η-5 bonding to the transition metal. One or more bulky ligands may be π-bonded to the transition metal atom. The transition metal atom may be a Group 4, 5 or 6 transition metal and/or a transition metal from the lanthanide or actinide series. Other ligands may be bonded to the transition metal, such as at least one halogen which serves as a leaving group. Non-limiting examples of metallocene catalysts and catalyst systems are discussed in for example, U.S. Pat. Nos. 4,530,914, 4,952,716, 5,124,418, 4,808,561, 4,897,455, 5,278,119, and 5,304,614 all of which are herein fully incorporated by reference. Further examples may be found in the disclosures of EP-A-0129368, EP-A-0520732, EP-A-0420436, WO 91/04257 WO 92/00333, WO 93/08221, and WO 93/08199 which are all fully incorporated herein by reference.

Various forms of metallocenes may be used in the polymerization process of this invention. Examples of the development of metallocene catalysts may be found in the disclosures of U.S. Pat. Nos. 4,871,705, 4,937,299, 5,324,800, 5,017,714 5,120,867, and EP-A-0 129 368 published Jul. 26, 1989 all of which are fully incorporated herein by reference. These publications teach metallocene structure and describe alumoxane as the cocatalyst. There are a variety of well known methods for preparing alumoxane such as those described in U.S. Pat. Nos. 4,665,208, 4,952,540, 5,091,352, 5,206,199, 5,204,419, 4,874,734, 4,924,018, 4,908,463, 4,968,827, 5,308,815, 5,248,801, 5,235,081, 5,157,137, 5,103,031, and EP-A-0561476, EP-B1-0279586, EP-A-0594218, and WO 94/10180, all of which are incorporated herein by reference.

The metallocene catalyst component can be a monocyclopentadienyl heteroatom containing compound which is typically activated by either an alumoxane, an ionic activator, a Lewis acid, or a combination thereof to form an active catalyst system. These types of catalyst systems are described in, for example, PCT International Publication WO 92/00333, WO 94/07928, and WO 91/04257, and WO 94/03506, U.S. Pat. Nos. 5,057,475, 5,096,867, 5,055,438, 5,198,401, 5,264,405 and 5,227,440 and EP-A-0 420 436, all of which are fully incorporated herein by reference. In addition, the metallocene catalysts useful in this invention can include non-cyclopentadienyl catalyst components such as boroles or carbollides in combination with a transition metal. Also useful may be those catalyst systems described in U.S. Pat. Nos. 5,064,802, 5,149,819, 5,243,001, 5,239,022, 5,276,208, 5,296,434, 5,321,106, and 5,304,614, and PCT publications WO 93/08221 and WO 93/08199 published Apr. 29, 1993 all of which are herein incorporated by reference.

The preferred transition metal components are those of Group 4, particularly, zirconium, titanium and hafnium. The transition metal may be in any oxidation state, preferably +3 or +4 or a mixture thereof. All of the catalyst systems of the invention may be prepolymerized or used in conjunction with an additive or scavenging component.

As used herein the term "metallocene" is defined to contain one or more unsubstituted or substituted cyclopentadienyl or cyclopentadienyl moieties in combination with a transition metal. In one embodiment the metallocene catalyst component is represented by the general formula $(C_p)_m MR_n R'_p$ wherein at least one $C_p$ is an unsubstituted or, preferably, a substituted cyclopentadienyl ring, even more preferably a monosubstituted cyclopentadienyl ring; M is a Group 4, 5 or 6 transition metal; R and R' are independently selected halogen, hydrocarbyl group, or hydrocarboxyl groups having 1–20 carbon atoms; m=1–3, n=0–3, p=0–3; and the sum of m+n+p equals the oxidation state of Me.

In another embodiment the metallocene catalyst component is represented by the formulas:

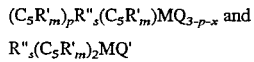

wherein M is a Group 4, 5, or 6 transition metal; $C_5R'_m$ is a substituted cyclopentadienyl; each R', which can be the same or different, is a hydrogen, alkyl, alkenyl, aryl, alkylaryl or arylalkyl radical having from 1 to 20 carbon atoms or two carbon atoms joined together to form a part of a $C_4$ to $C_{20}$ ring; R" is one or more or a combination of a carbon, a germanium, a silicon, a phosphorous or a nitrogen atom containing radical bridging two $(C_5R'_m)$ rings, or bridging one $(C_5R'_m)$ ring to M when p=0 and x=1, otherwise "x" is always equal to 0; each Q, which can be the same or different, is an aryl, alkyl, alkenyl, alkylaryl, or arylalkyl radical having from 1 to 20 carbon atoms, or alkoxide, or Q is a halogen; Q' is an alkylidene radical having from 1–20 carbon atoms; s is 0 or 1 and when s is 0, m is 5 and p is 0, 1 or 2, and when s is 1, m is 4 and p is 1.

The metallocene activator may be any compound or component which can activate a bulky ligand transition metal compound or a metallocene as defined above. Alumoxane may be used as the activator as well as ionizing activators, neutral or ionic. For example, compounds such as tri(n-butyl) ammonium bis(pentaflurophenyl) boron, which ionize the neutral metallocene compound, may be used as the activator. Examples of ionizing activators and methods of their production and use may be found in U.S. Pat. Nos. 5,153,157; 5,198,401; 5,241,025; and 5,278,119, incorporated fully herein by reference.

Alumoxane is represented by the formula: R—(Al(R)—O)$_n$—AlR$_2$ for oligomeric linear alumoxanes and (—Al(R)—O—)$_m$ for oligomeric cyclic alumoxane wherein n and m is 1 to 40, preferably 3 to 20, and R is a $C_{1-8}$ alkyl group or R is an $C_{6-18}$ aryl group, or hydrogen, preferably a methyl group, or R can be mixtures of alkyl and aryl substituents. Alumoxane or methylalumoxane can be prepared by a variety of known processes such as that illustrated in, for example, U.S. Pat. No. 4,665,208, incorporated herein by reference.

The support material may be any support material, preferably a porous support material such as talc, inorganic oxides, inorganic chlorides, and resinous support materials such as polyolefin or polymeric compounds or any other organic support material. Among the more preferred support materials are inorganic oxide materials which include those from the Periodic Table of the Elements of Groups 2, 3, 4, 5, 13, or 14 metal oxides. Particularly preferred support materials include silica, alumina, silica-alumina, and -mixtures thereof. Other inorganic oxides that may be used either alone or in combination with other support materials include magnesia, titania, zirconia, and the like. In addition, spray-dried polystyrenes may be used as described in U.S. patent application Ser. No. 08/214,922 now abandoned fully incorporated herein by reference. The support material may optionally be either partially or totally dehydrated or may optionally have hydroxyl groups neutralized.

The support will preferably have a surface area in the range of from about 10 m²/g to about 700 m²/g, a pore volume in the range of from about 0.1 cc/g to about 5.0 cc/g, and average particle size in the range of from about 1 μm to about 500 μm. More preferably, the support will have a surface area in the range of from about 50 m²/g to about 500 m²/g, pore volume in the range of from about 0.5 cc/g to about 3.0 cc/g, and average particle size in the range of from about 30 μm to about 100 μm. The support pore size in terms of the average diameter of the pores is typically in the range of from about 10 Å to about 1000 Å, preferably the pore size will be in the range of from about 50 Å to about 500 Å, more preferably the pore size will be in the range of from about 75 Å to about 350 Å.

The supported catalyst system of the invention can be made in a variety of ways. The metallocene catalyst may be slurried in a solvent either separately from or together with the activator and vice versa. Preferably, the metallocene component and activator are slurried together in a solvent to form a single mixed solution. As used hereafter, "catalyst solution" means any solution comprising a catalyst component such as a metallocene and/or activator component. "Solution" as used herein includes a suspension, a slurry, a mixture, or the like. The solvent may be any compatible liquid capable of forming a solution or the like with at least one catalyst component and/or at least one activator. Preferred Solvents include hydrocarbon solvents such as toluene, xylene, hexane, pentane, and the like.

In one embodiment, the total volume of the catalyst solution which is applied at one time to the support is less than about 4 times the pore volume of the support, preferably the solution volume will be less than about 2.0 times the pore volume of the support, even more preferably, less than about 1.5 time the pore volume of the support. The procedure for measuring the total pore volume of a porous support is well known in the art. Details of one of these procedures can be found in Volume 1, Experimental Methods in Catalytic Research, 67–96 (Academic Press, 1968). This preferred method, which is the one used herein, involves the use of a classical BET apparatus for nitrogen absorption. Mother method well known in the art is described in Innes, Total Porosity and Particle Density of Fluid Catalysts By Liquid Titration, Vol 28, No.3, Analytical Chemistry 332–334 (March, 1956).

The ratio of the total volume of the catalyst solution to the total pore volume of the support may be in the range of from about 4:1 to about 0.1:1, preferably about 2.5:1 to about 0.5:1, more preferably about 2:1 to about 0.8:1, most preferably about 1.5:1 to about 0.95:1. In some embodiments it may be preferable to use more than one pore volume of catalyst solution but less than that volume required to form a slurry, i.e., a ratio of catalyst solution to total pore volume of about 1.1:1 to about 2.0:1, preferably about 1.2:1 to about 1.8:1, more preferably about 1.3:1 to about 1.7:1. The pore volume loading is equal to the total volume of the catalyst solution divided by the pore volume of the support times 100%. In one embodiment, the pore volume loading is less than 400%, preferably less that 300%, more preferably less than 200%, and even more preferably 150% or less.

The mole ratio of the metal of the activator to the transition metal of the metallocene is preferably in the range of ratios between 0.3:1 to 1000:1, more preferably 20:1 to 800:1, and most preferably 50:1 to 500:1. If the activator is an ionizing activator, the mole ratio of the metal of the activator to the transition metal is preferably in the range of ratios between 0.3:1 to 3:1.

It is within the scope of this invention to use antistatic agents and or other additives such as wetting agents. Antistatic agents are described in U.S. Pat. No. 5,283,278, fully incorporated herein by reference. Examples of antistatic agents include but are not limited to alcohol, thiol, silanol, diol, ester, ketone, aldehyde, acid, amine, and ether compounds. The antistatic agent may be added at any stage in the formation of the supported catalyst system, however, preferably the antistatic agent is added, if at all, after the supported catalyst system is formed while the catalyst system is either in a slurry or free flowing state.

After the catalyst solution is prepared, an appropriate volume of the solution is applied to the support such that the solution is evenly applied to the support, i.e., the solution is distributed over the support so that substantially every support particle is contacted with approximately the same volume of catalyst solution. This is accomplished using various combinations of means of mixing and/or means of catalyst solution application.

If the support material is mixed or agitated rapidly, the catalyst solution may be added to the support using relatively large droplet sizes such as occur in a fine stream. If, however, the support material is mixed relatively slowly or not at all, then in order to achieve uniform distribution in the absence of other aids, small droplet sizes or finely divided droplets such as occur in a spray, mist or fog are preferable.

As used herein, "spray" means any collection of small droplets including but not limited to a fine liquid stream, a gas, mist, fog, aerosol, vapor, and mixtures thereof. The spray may be applied to the support either batch wise or continuously provided that for any one application, the total volume of metallocene solution applied to a given volume of support does not exceed the desired pore volume loading.

The diameter of the droplets may vary anywhere from about 1 micron to about 2 millimeters. The liquid droplet diameter is preferably between 1 to 60 percent of the support particle size, more preferably between 5 to 40 percent of the support particle size. The preferred range will depend on such factors as the size of the support particles and the method of mixing, if any, used. For example, a range of 2.5 to 20 microns might be appropriate for a support of 50 micron average particle size.

Means for spraying the catalyst solution include the use of one or more nozzles, sprinklers, loggers, atomizers, and the like. The spray is preferably applied to the support without wetting the sides of the vessel in which the support is contained. Thus, the spray geometry should be tailored to the container geometry but for purposes of this invention, the spray may be any shape or geometry including but not limited to conical, spherical, and planar. Likewise, the spray may be any angle. Preferably a means for mixing or agitating the support particles is used while the spray is applied to the support and the shape of the spray may be chosen based on the type of mixer or agitator used and the speed of and efficient of agitation achieved.

Alternatively, the catalyst solution may be applied to a stationary bed of support material using pressure to push and/or vacuum to pull the solution through a column or the like. The volume of catalyst solution should be enough to wet all of the support. The volume of the catalyst solution is preferably of a size relative to the support so that the loading of the catalyst solution per gram of support is uniform throughout the bed.

The spray may be applied on the surface of the support and/or the spray may be directed through or within the support. Thus, the support may be perfused with the catalyst solution, interfused with the catalyst solution, blended with the catalyst solution or otherwise combined with the catalyst solution to achieve even distribution. The choice of droplet size and mode of application will depend upon the type of mixer, agitator or blender used and the speed or efficiency of mixing. Preferably, the catalyst solution is filtered or otherwise treated to remove any matter not easily sprayed or atomized.

A means for mixing the support is preferably used while the spray is applied. Any means of mixing or agitation may be used. Such means include mixers and agitators with one or more extending arms. The arms may be of any shape, length, and orientation. Thus, helical, ribbon mixers, plow, and paddle mixers and the like may be used as well as impeller agitators. Both vertical and horizontal mixers and blenders may be used. Shakers, rotators, and vibrators may also be used and the mixing may be continuous or batchwise. Any means, including any mechanical or pneumatic means, for moving the support particles while the catalyst solution is being applied is within the scope of this invention as long as the solution is distributed evenly among the support particles.

Preferably, the means for mixing or moving the support does not cause the support to break or fracture in substantial numbers so that the support is substantially free from fines. Nozzles, hoses, mixers, and the like may be composed of any suitable material not likely to interfere with the catalyst solution and/or support and not likely to degrade upon contact with the catalyst solution.

The spray may be applied at any pressure, over any period of time, and at any temperature so long as the temperature of the solution and/or support is maintained such that the components of the catalyst solution, such as a metallocene, do not decompose and the solution does not solidify. Thus, for catalyst solutions in toluene, the temperature should preferably be maintained between about 111° C. and about −93° C. Pressure may be used during application of the catalyst solution to increase the speed with which the catalyst solution is transported into the individual pores of the support material. For example, a vacuum may be applied to the silica so that upon solution contact, the pores are filled more efficiently. Likewise, pressure may be applied during or after introduction of the solution to effect the same result. After application of the catalyst solution, the support may be dried either partially or totally and used as a free flowing powder or the support may be suspended in a hydrocarbon solvent and the catalyst used as a slurry. Drying may be accomplished using conventional pump and vacuum equipment or a cryogenic pump may be used for drying and solvent recovery.

Those skilled in the art will appreciate that there exists a wide variety of possible combinations of mixing means and spraying means which may be used to achieve uniform application distribution of the catalyst solution on and within the support. A number of mixers primarily intended for use in other areas such as for pharmaceutical coating and the like can be adapted for supporting a catalyst solution using techniques of even distribution in accordance with this invention. What follows is a brief description of some possibilities.

In one embodiment, the supported catalyst may be prepared in a rotating batch blender. Several different vessel geometries are possible with this type of apparatus. This type of blender is generally comprised of a rotating drum with lifters and baffles attached internally. One representative unit is the "700 Series" rotary batch blender sold by Munson Machinery Company, Inc. (P.O. Box 855, Utica, N.Y. 13503-0855, USA). This configuration provides fast, thorough, gentle mixing. A liquid addition manifold can be used to spray the catalyst solution onto the support material. This process would most likely be compatible with liquid addition volumes as high as 400% of the total support pore volume, but more preferably, the total liquid volume added would be between about 50% and about 150% of the total support pore volume.

One example of a process using an alternative vessel geometry involves the use of a double-cone blender for contacting the catalyst solution and the support material. This type of equipment is available from several manufacturers, and one representative unit is available from Patterson Kelley Co. (East Stroudsburg, Pa. 18301, USA). As illustrated in FIG. 1, the double-cone blender generally comprises a cone 10 extending into two separated cylinders 12. The entire assembly rotates so that the silica support within the blender is separated into two parts within the cylinders 12 and then re-combined in the cone 10 with each rotation. A liquid addition manifold 16 is mounted on the axis of rotation of the blender. The double cone blender may optionally be equipped with internal baffles to improve the quality of mixing. In this type of supporting process the support wetted with the catalyst solution may or may not need to be unloaded into a separate vessel for drying.

Figure 2:
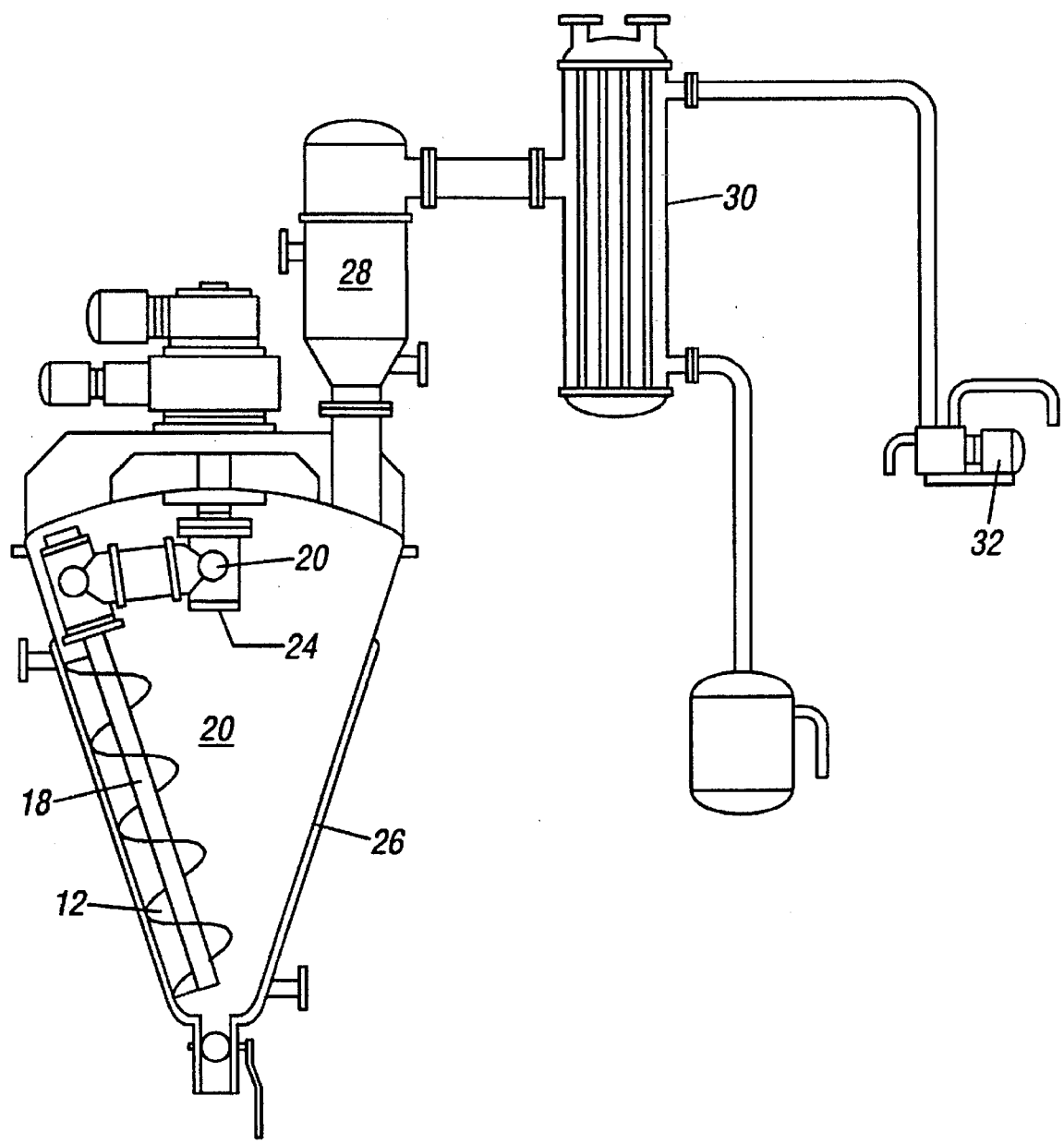
FIG. 2 is a partial horizontal cross-section of a vertical, conical blender with attached vacuum drying assembly.

In another embodiment, the supported catalyst is prepared in a vertical, conical dryer. This type of equipment, which is illustrated in FIG. 2, is available from several manufacturers, and one representative unit is a V-series blender sold by Charles Ross and Son Company (P.O. Box 12308, Hauppauge, N.Y. 11783-0615, USA). This dryer is equipped with an orbiting mixing arm 18 that provides thorough, gentle mixing which minimizes fracturing of the support material during the supporting process. The mixing arm 18 is equipped with a rotatable helical blade 12 that conveys solids up from the bottom of the conical section 20.

Because the apparatus is operated under an inert atmosphere, the catalyst solution is applied to the support without exposure to air or moisture. A number of different methods of liquid addition may be adapted for use with this unit. The catalyst solution may be added through ports in the dryer head in which case it is preferable to stop rotation of the arm about the cone so that catalyst solution is not contacted with the arm. Preferably the catalyst solution is added through the bottom of the arm assembly 22 so that the liquid impinges directly on the support rather than on the arm or wall of the vessel. The catalyst solution may be applied dropwise or as a stream directly or a dip tube may be used, however, may be preferable to use a spray nozzle 24 projecting from the bottom of the arm assembly 22.

These types of units are ideal for small batches of catalyst or large batches (up to 454 kg or more) with very uniform catalyst distribution on the silica. The total volume of liquid added to the silica using this equipment may range from 50% to 400% of the total support material pore volume, preferably 50% to 150%.

The conical section 20 of the vertical, conical dryer has a conical jacket section 26 which enables the supported catalyst solids to be heated and efficiently dried within the mixer if such drying is desired. The conical design of the dryer provides for efficient and thorough drying even of small batch sizes. The unit is also equipped with a vacuum drying assembly comprising a filter 28, a condenser 30, and a vacuum pump 32 which could be used to recover the solvent used during preparation.

With this type of conical dryer, a typical catalyst supporting operation is comprised of the following steps:

1. Under inert atmosphere, the desired support material is charged to the conical dryer;
2. after the agitator is started, the catalyst solution is applied; and 3. once the desired amount of solution is applied, the solids are dried under vacuum.

Another embodiment involves the use of a horizontal mixer. This type of equipment is available from several vendors. One representative example is made by H. C. Davis Sons Manufacturing Co. Inc. (P.O. Box 395, Bonner Springs, Kans. 66012, USA). The general supporting procedure is the same as described above, only the geometry of the mixer and agitator are different. The solids are placed in a jacketed trough, which can optionally be equipped with mixing equipment such as a double-helical ribbon mixer. The vessel is equipped with the appropriate seals to assure that an inert atmosphere is maintained at all times. The catalyst solution may be introduced via a feed manifold on the mixer cover, equipped with one or more spray nozzles. The total liquid volume that can be added to the solids in this type of process the pore volume loading can range from about 50% to about 400%.

Figure 3:
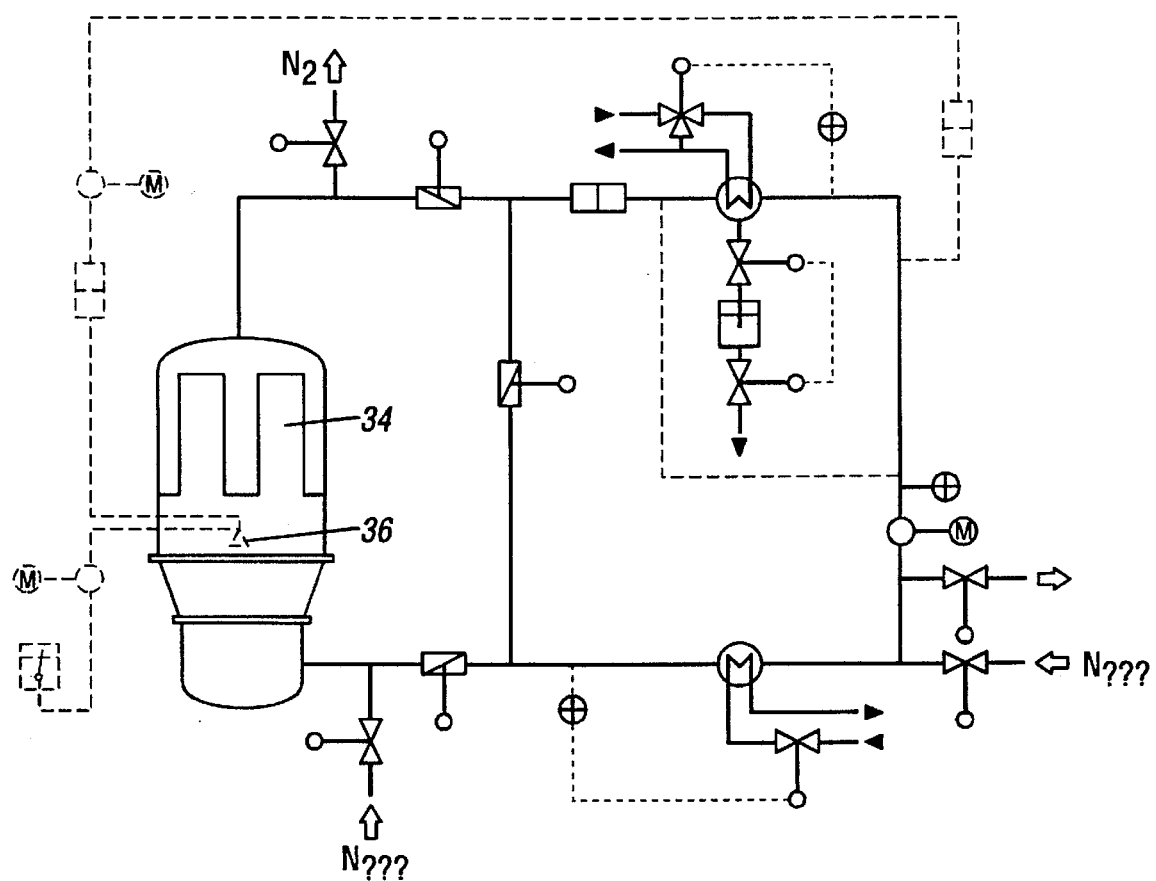
FIG. 3 is a schematic view of a fluidized bed process.

In another embodiment, the supported catalyst may be prepared in a process wherein the mixing of the support material is performed by gas fluidization. This type of supporting process is represented, for example, by an apparatus available through Glatt Air Techniques, Inc. (20 Spear Rd., Ramsey, N.J. 07446, USA). Using this type of equipment, illustrated in FIG. 3, the support material is added to the supporting chamber 34. The chamber 34 is equipped with a screen to support the catalyst carrier material, and to evenly distribute the fluidizing gas. A flow of inert gas is used to fluidize the catalyst support material. In this embodiment, the catalyst solution may be applied through a spray nozzle 36 at the top of the fluidized bed of support. After the desired mount of solution is added, the fluidizing gas is heated to begin the drying step of the process. Optionally, a vacuum drying system can be used.

Figure 4A:
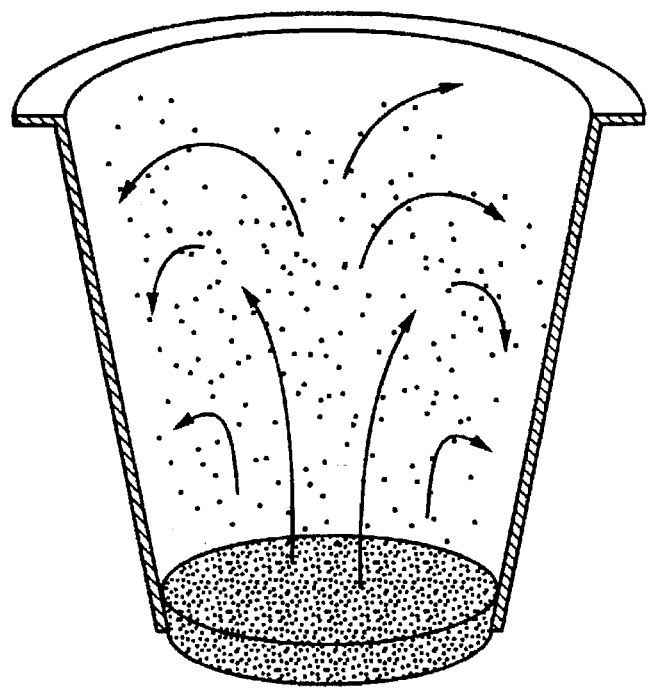
FIG. 4a is a horizontal cross-section of a standard fluidized bed assembly.
Figure 4B:
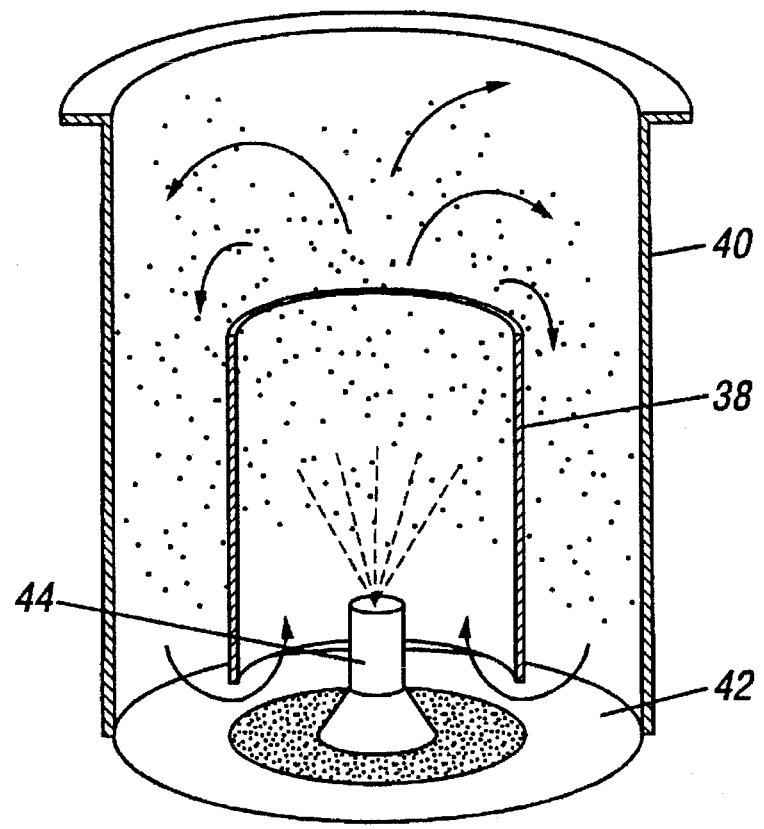
FIG. 4b is a horizontal cross-section of a Wurster fluidized bed assembly.

FIG. 4a illustrates a standard fluidized bed process. A special variation of the fluidized bed process utilizes a Wurster processing insert (also available from Glatt Air Techniques). The Wurster insert is illustrated in FIG. 4b and comprises a cylindrical partition 38, and a specially designed distributor plate 16. This distributor plate directs the majority of the fluidizing gas flow through the inner cylindrical partition 38. Thus, the general flow pattern of the support particles is upward inside the cylindrical partition 38, and downward outside of the cylinder 18. Another difference with the Wurster process is that the spray nozzle 20 is located at the bottom of the cylinder 40, just above the distributor plate 42. The nozzle 44 sprays upward, providing a cocurrent application of solution to the support material.

For catalyst supporting processes based upon these fluidized bed designs, the presence of liquid in substantial excess of the support pore volume capacity may lead to loss of fluidization due to agglomeration of the solid particles. However, it would be possible to select operating conditions, i.e., temperature, solution addition rate, solution droplet size, and pressure, that will permit the addition of catalyst solution in excess of one total pore volume while avoiding significant agglomeration.

Of primary importance in all of these processes and in every process in accordance with this invention is the even distribution during the application stage of the catalyst solution over and within the support material so that substantially all of the support particles are rapidly in contact with substantially the same volume of catalyst solution. Although there is a wide variation of combinations of mixing and spraying means, those skilled in the an will appreciate that the more effective the mixing means is, the less finely divided the catalyst solution must be and vice versa.

The supported catalyst may be prepolymerized using one or more alpha olefins. The prepolymerization may be carried out batchwise or continuously in gas, solution, or slurry phase. Any alpha-olefin monomer or combination of monomers may be used but preferably the catalyst is prepolymerized with $C_2$–$C_6$ alpha olefin, more preferably $C_2$–$C_4$ alpha olefin, most preferably $C_2$–$C_3$ alpha olefin. Details regarding prepolymerization may be found in U.S. Pat. Nos. 4,923,833 and 4,921,825 and EP-B-0279 863, published Oct. 14, 1992 all of which are incorporated fully herein by reference.

The catalyst system of this invention is suited for the polymerization of monomers and optionally comonomers in any polymerization or prepolymerization process, including gas, slurry, and solution phase; even a high pressure autoclave process may be used. In the preferred embodiment, a gas phase or slurry phase process is used. Any alpha-olefin monomer or combination of monomers may be used but preferably $C_2$–$C_6$ monomers are polymerized, more preferably $C_2$–$C_4$ monomers and most preferably $C_2$–$C_3$ monomers.

Typically, in a gas phase polymerization process, a continuous cycle is used where in one part of the reactor cycle, a recycle stream or fluidizing stream is heated by the heat of polymerization. This heat is removed using a cooling system in another part of the cycle. (See for example, U.S. Pat. Nos. 4,543,399, 4,588,790, 5,028,670, 5,352,749, and U.S. application Ser. No. 065,250, filed May 20, 1993 now abandoned all of which are fully incorporated herein by reference.)

Generally, in a gas fluidized bed process for producing polymer from monomers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

A slurry polymerization process generally uses pressures in the range of about 0.48 kPa to about 240 kPa and above. Temperatures typically range from –60° C. to about 280° C. A suspension of solid particulate polymer is formed in a liquid polymerization medium to which monomers and comonomers along with catalyst are added. The liquid medium may be an alkane or cycloalkane, or an aromatic hydrocarbon such as toluene, ethylbenzene or xylene. The liquid medium selected should be liquid under the conditions of polymerization and it should also be relatively inert. The preferred liquid mediums are hexane or isobutane.

Alternatively, a slurry polymerization may be used wherein the olefin monomer serves as the polymerization diluent. Generally this type of polymerization is carried out using a pressure of from about 67 kPa to about 6,700 kPa, most preferably from about 276 kPa to about 4,137 kPa. The diluent is maintained at a temperature of from about –10° C. to about 150° C., preferably from about 20° C. to about 100° C., and most preferably from about 30° C. to about 90° C.

A scavenging agent may be used in these polymerization processes, however, it may be beneficial to reduce or essentially eliminate the use of such agents. It may be preferable to use a scavenger during reactor start-up to remove impurities and ensure polymerization is initiated. If a scavenger is used during start-up, then preferably it is present in an amount less than 300 ppm, preferably less than 250 ppm, more preferably less than 200 ppm, even more preferably less than 150 ppm, still more preferably less than 100 ppm, and most preferably less than 50 ppm based on the total weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of scavenger is halted.

In another embodiment the scavenger is present in an amount sufficient until the catalyst of the invention has achieved a catalyst productivity on a weight ratio basis of greater than 1000 grams of polymer per gram of the catalyst, preferably greater than about 1500, more preferably greater than 2000, even more preferably greater than 2500, and most preferably greater than 3000.

Alternatively, the scavenger is present in an amount sufficient until the catalyst of the invention has achieved a catalyst productivity 40 percent that of steady state, preferably less than 30 percent, even more preferably less than 20 percent and most preferably less than 10 percent. If the scavenger is used solely during start-up, then it is preferably introduced at a rate sufficient to provide an increase in catalyst productivity on a weight ratio basis of a rate of 200 grams of polymer per gram of catalyst per minute, preferably at a rate of 300, even more preferably at a rate of 400 and most preferably at a rate of 500.

In another embodiment, the mole ratio of the metal of the scavenger to the transition metal of the metallocene catalyst component equals about 0.2 multiplied by the ppm of a scavenger based on the production rate multiplied by the catalyst productivity in kilograms of polymer per gram of catalyst. The range of the mole ratio is from about 300 to about 10. In a preferred embodiment, tri-ethyl aluminum or another alkyl aluminum is used as the scavenger and the mole ratio is represented as aluminum (Al) to transition metal, for example, zirconium, where the moles of Al are based on the total amount of scavenger used.

In another embodiment the amount of scavenger utilized, if any, is in a mole ratio less than 100, preferably less than 50, more preferably less than about 25 based on the mole ratio of the metal of the transition metal scavenger to the transition metal of the metallocene. If the scavenger is an aluminum containing organometallic compound and the transition metal of the metallocene is a Group 4 metal then the mole ratio above is based on the moles of aluminum to the moles of the Group 4 metal of the catalyst.

When a gas phase polymerization process is used, preferably the process operates in a condensed mode. This means that a recycle stream having a liquid and a gas phase is purposefully introduced into the reactor such that the weight percent of liquid based on the total weight percent of the recycle stream is greater than about 2.0 weight percent.

The total weight of the recycle stream may be in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed liquid can be used depending on the desired production rate.

EXAMPLES

In order to provide a better understanding of the invention including representative advantages thereof, the following examples are offered.

EXAMPLE 1

Figure 5:
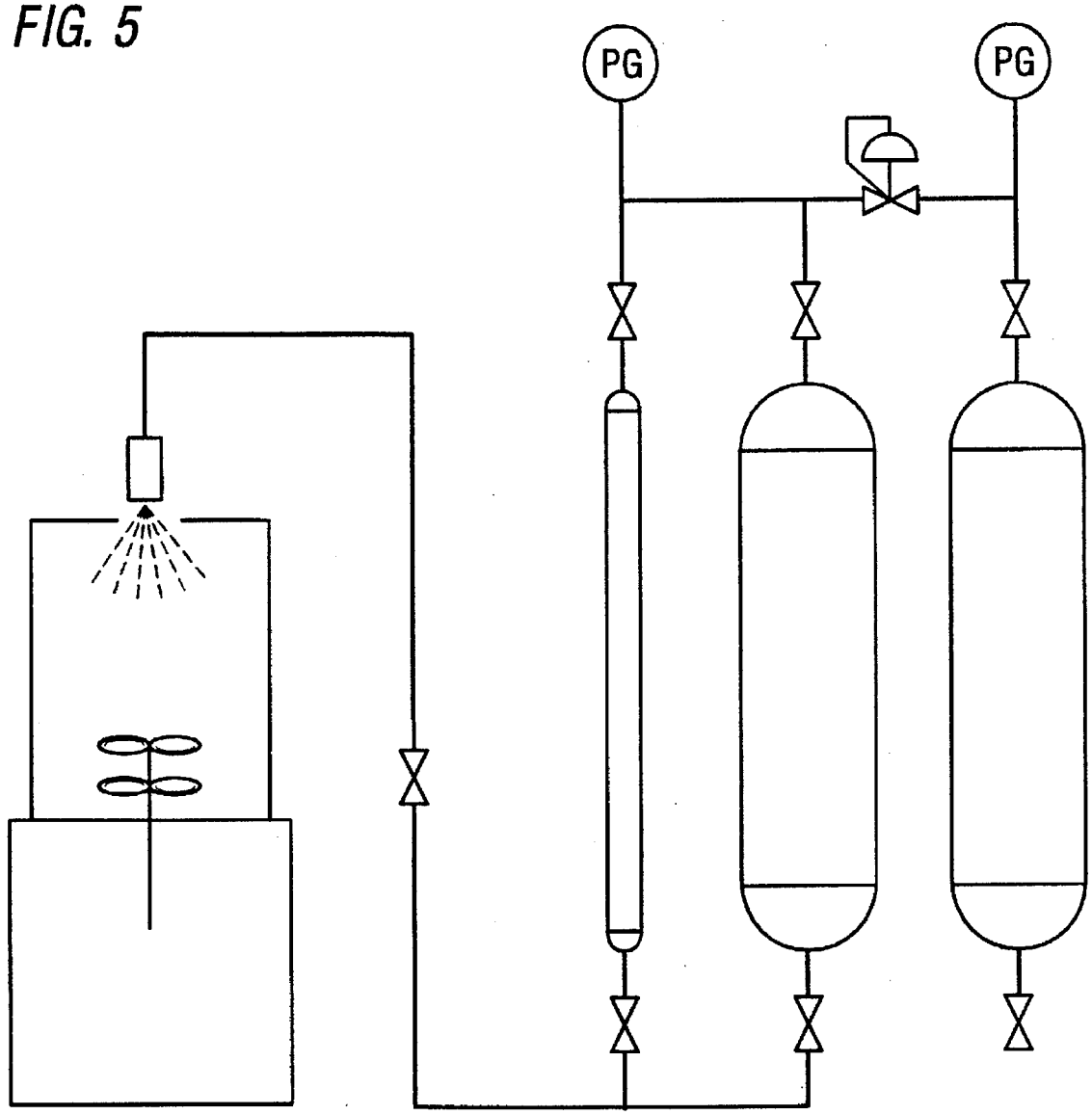
FIG. 5 is a schematic view of an embodiment of the present invention.

A supported catalyst system was prepared using the equipment illustrated in FIG. 5. Under $N_2$, 940 g of 30 wt. % methylalumoxane solution was added to 20 g bis(1,3- methylbutylcyclopentadienyl)zirconium dichloride followed by 166 g of toluene (Albemarle Corporation, Baton Rouge, La., USA) to form the catalyst solution. The solution was poured through a screen pack (400 mesh) prior to charging into the primary tank 10. Separately, 800 g of MS948 silica (Davison Chemical Division of W. R. Grace, Baltimore, Md., USA) previously dehydrated in a stream of flowing $N_2$ was added to the spraying chamber 12. Nitrogen was added to the secondary tank 14 until the pressure was 621 kPa (90 psig). A pressure regulating valve 16 between the primary and secondary tanks 10, 14 was used to maintain 172 kPa (25 psig) $N_2$ pressure on the primary tank 10. A spray nozzle 18 was positioned above the silica in the spraying chamber 12 and the spraying chamber agitator 20 was activated in order to mix the silica. Spraying of the catalyst solution was initiated by opening the feed valve 22 connecting the spray nozzle 18 to the primary tank 10. The position of the spray nozzle 18 was adjusted so that the area of conical spray matched the surface area of the mixed silica. All of the solution was then applied to the silica. The pore volume loading of the silica was 95% and the raw catalyst was finely divided and free flowing. The raw catalyst was dried under vacuum and elevated temperature. Analysis showed a loading of 12.23 wt. % Al and 0.38 wt. % Zr with an Al/Zr molar ratio of 110.

EXAMPLE 2

Using the apparatus and procedure of Example 1, 783 g of the 30 wt. % methalumoxane solution, 8.45 g dimethylsilyl-bis(2-methyl-4,5-benzoindenyl)zirconium dichloride, and 248 g toluene were combined to form the catalyst solution. The solution was added in the spraying chamber 12 to 800 g of MS948 silica previously dehydrated in a stream of flowing $N_2$. The pore volume loading of the silica was 95% and the raw catalyst was finely divided and free flowing. The raw catalyst was dried under vacuum at elevated temperature. Analysis showed loading of 12.14 wt. % Al and 0.13 wt. % Zr with an Al/Zr molar ratio of 319.

EXAMPLE 3

A supported catalyst was prepared using the equipment illustrated in FIG. 2. Under N2, a solution of 54 lbs of 30 wt. % Methyl Alumoxane solution in Toluene was added to 528 grams of bis(1,3 methyl butylcyclopentadienyl) zirconium dichloride and 44 lbs of toluene to form a catalyst solution (A). Separately, 50 lbs of 800 C dehydrated Davison 948 type silica was charged to the conical dryer (FIG. 2). With the orbit arm in a stationary position, but with the screw turning the catalyst solution (A) was added to the silica support thru a dip tube with a directed stream into the solid bed while mixing with the orbit arm screw. When addition was complete, the dip tube was withdrawn and the orbit arm was started and mixing was initiated for 1 hour at ambient conditions. Then a solution of 160 grams of AS990 antistat agent (WITCO) in toluene solution was added to the conical dryer via a dip tube with the orbit arm stationary and the agitator screw turning. After addition of the AS990 solution was complete, the orbit arm was restarted and the contents of the conical dryer were held at ambient temperature while mixing for one half hour. Then, the temperature of the dryer was increased to 76° C. (170° F.) and the dried for 4 hours with vacuum. Subsequently, the temperature was reduced to 71° C. (160° F.) and drying continued for 10 hrs. The pore volume loading of the silica was 150% prior to drying. Analysis showed that the Alumoxane loading of the catalyst was 11 wt. %, the Zirconium loading was 0.38 wt. % with a Al/Zr ratio of 97.

EXAMPLE 4

A supported catalyst was prepared using the equipment illustrated in FIG. 2. Under N2, a solution of 54 lbs of 30 wt. % Methyl Alumoxane solution in Toluene was added to 258 grams of dimethylsilyl-bis(2 methyl-4,5 benzo-indenyl) zirconium dichloride and 36 lbs of toluene to form a catalyst solution (B). Separately, 50 lbs of 800 C dehydrated Davison 948 type silica was charged to the conical dryer (FIG. 2). With the orbit arm in a stationary position, but with the screw turning, the catalyst solution (B) was added to the silica support thru a dip tube with a directed stream into the solid bed while mixing with the orbit arm screw. When addition was complete, the dip tube was withdrawn and the orbit arm was started and mixing was initiated for 1 hour at ambient conditions. Then, the temperature of the dryer was increased to 76° C. (170° F.) and the dried for 4 hours with vacuum. Subsequently, the temperature was reduced to 71° C. (160° F.) and drying continued for 10 hrs. The pore volume loading of the silica was 125% prior to drying. Analysis showed that the Aluminum loading of the catalyst was 9.27 wt. %, the Zirconium loading was 0.10 wt. % with a Al/Zr ratio of 280.

POLYMERIZATIONS

A sample of catalyst as prepared in Examples 1 and 3 above was used for ethylene/1-hexene copolymerization as described below. A continuous fluid bed gas-phase reactor operated at 2,068 kPa (300 psig) total pressure was used. A solution of TEAL (1 wt. % in isopentane) was fed into the reactor. The composition of components in the fluidizing gas is detailed in Table 1, along with the process data and properties of the polymer samples collected after several bed turnovers. No significant fouling was observed.

TABLE 1

| Catalyst | Ex. 1 | Ex. 3 |
|---|---|---|
| Process Data | | |
| Pressure (kPa) | 2069 | 2069 |
| H$_2$(ppm) | 79 | 76 |
| C$_6$(mol %) | 0.52 | .49 |
| C$_2$(mol %) | 30.4 | 30.6 |
| H$_2$/C$_2$ Ratio | 2.6 | 2.5 |
| C$_6$/C$_2$ Ratio | 0.017 | 0.016 |
| Reactor Temp.(°C.) | 68 | 68 |
| Productivity (g/g) | 1561 | 864 |
| Polymer Data | | |
| Melt Index (g/10 min) | 1.67 | 1.72 |
| HLMI* (g/10 min) | 31.0 | 28.6 |
| Density (g/cc) | 0.9118 | 0.9172 |
| APS** (microns) | 639 | 633 |
| Bulk Density (g/cc) | 0.458 | 0.423 |

*high load melt indexd
**average particle size

A sample of the catalyst as prepared in Example 2 above was used for propylene polymerization as described below. The catalyst was slurried in 2 ml of hexane and charged by 250 ml of propylene into a 2 liter autoclave reactor at 65° C., previously flushed with nitrogen and containing TEAL (0.5 ml of a 1.6M solution in hexane) and 1000 ml of propylene. After 1 hour polymerization, the reactor was cooled, vented and purged with nitrogen for 20 minutes. The product was collected and dried in vacuo for minimum of 2 hours at 75° C. to remove residual propylene and hexane. Productivity of the catalyst was 1962 g/g. No significant fouling was observed.

While the present invention has been described and illustrated by reference to preferred embodiments, it will be appreciated by those of ordinary skill in the art that the invention lends itself to variations not necessarily illustrated herein.

What is claimed is:

1. A process for producing polyolefins, said process comprising the step of contacting under polymerization conditions olefin(s) and supported catalyst wherein the catalyst is made by the process comprising the steps of:

(a) forming a spray from a volume of catalyst solution comprising a metallocene catalyst component; and (b) contacting the spray with a porous support material while agitating the support material wherein the volume of catalyst solution is in the range of from more than one times the total pore volume of the support material to less than that volume of solution required to form a slurry when contacted with the porous support.

2. The process of claim 1 wherein the catalyst solution comprises a metallocene catalyst component and an alumoxane catalyst component.

3. The process of claim 1 wherein the volume of catalyst solution is in the range of from less than 2.0 times the total pore volume of the porous support to above 1.0 times the total pore volume of the porous support material.

4. The process of claim 1 wherein the volume of catalyst solution is in the range of from less than about 1.5 times the total pore volume of the porous support to more than one times the total pore volume of the porous support material.

5. The process of claim 1 wherein the porous support is dried after contact with the spray.

6. The process of claim 1 wherein the catalyst solution is filtered prior to forming a spray.

7. The process of claim 1 wherein the contact between the spray and porous support material occurs in a rotating batch blender.

8. The process of claim 1 wherein the contact between the spray and porous support material occurs in a double-cone blender.

9. The process of claim 1 wherein the contact between the spray and porous support material occurs in a vertical, conical dryer.

10. The process of claim 1 wherein the contact between the spray and porous support material occurs in a horizontal mixer.

11. The process of claim 1 wherein the porous support is placed under pressure above atmospheric pressure during contact with the catalyst solution.

12. The process of claim 1 wherein the contact between the catalyst solution and porous support material occurs while the support material is fluidized.

* * * * *